US008839129B2

(12) United States Patent
Lau

(10) Patent No.: US 8,839,129 B2
(45) Date of Patent: Sep. 16, 2014

(54) USER INTERFACE FOR A COMMUNICATION DEVICE

(75) Inventor: Peter Y. F. Lau, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 974 days.

(21) Appl. No.: 12/340,357

(22) Filed: Dec. 19, 2008

(65) Prior Publication Data

US 2010/0162153 A1 Jun. 24, 2010

(51) Int. Cl.
*G06F 3/048* (2013.01)
*G06F 3/0488* (2013.01)
*H04M 3/56* (2006.01)

(52) U.S. Cl.
CPC .......... *H04M 3/563* (2013.01); *H04M 2207/18* (2013.01); *H04M 3/564* (2013.01); *H04M 2201/42* (2013.01); *G06F 3/0488* (2013.01); *H04M 2250/22* (2013.01); *H04M 2250/62* (2013.01)
USPC .......................................... 715/769; 715/810

(58) Field of Classification Search
CPC ....................................... G06F 3/048
USPC ................................. 715/769, 810
See application file for complete search history.

(56) References Cited

U.S. PATENT DOCUMENTS

| 5,940,488 | A | 8/1999 | DeGrazia | |
|---|---|---|---|---|
| 6,009,469 | A * | 12/1999 | Mattaway et al. | 709/227 |
| 6,505,040 | B1 | 1/2003 | Kim | |
| 7,231,208 | B2 * | 6/2007 | Robertson et al. | 455/416 |
| 7,487,441 | B2 * | 2/2009 | Szeto | 715/234 |
| 2007/0157089 | A1 * | 7/2007 | Van Os et al. | 715/702 |
| 2008/0168361 | A1 | 7/2008 | Forstall | |
| 2009/0007017 | A1 * | 1/2009 | Anzures et al. | 715/835 |

OTHER PUBLICATIONS

"Vodafone Conference Call—Mobile Phone Conference Calling," Westlake Business Communications, Romford, U.K., <http://www.westlake.co.uk/Vodafone_Conference_Call.htm> [retrieved Dec. 12, 2008], 4 pages.

* cited by examiner

*Primary Examiner* — Tadeese Hailu
*Assistant Examiner* — Darrin Hope
(74) *Attorney, Agent, or Firm* — Perkins Coie LLP

(57) ABSTRACT

A user interface for a communication device allows a user to set up and manage conference communications. The user interface has an active communication area and a held communication area. Communication icons representing communications at the communication device are shown in either the active or held areas of the user interface. By detecting where a user has positioned one or more communication icons within the user interface, the communication device handles the communications to place communications in conference, place communications on hold, swap held and active communications, or disconnect communications.

15 Claims, 12 Drawing Sheets

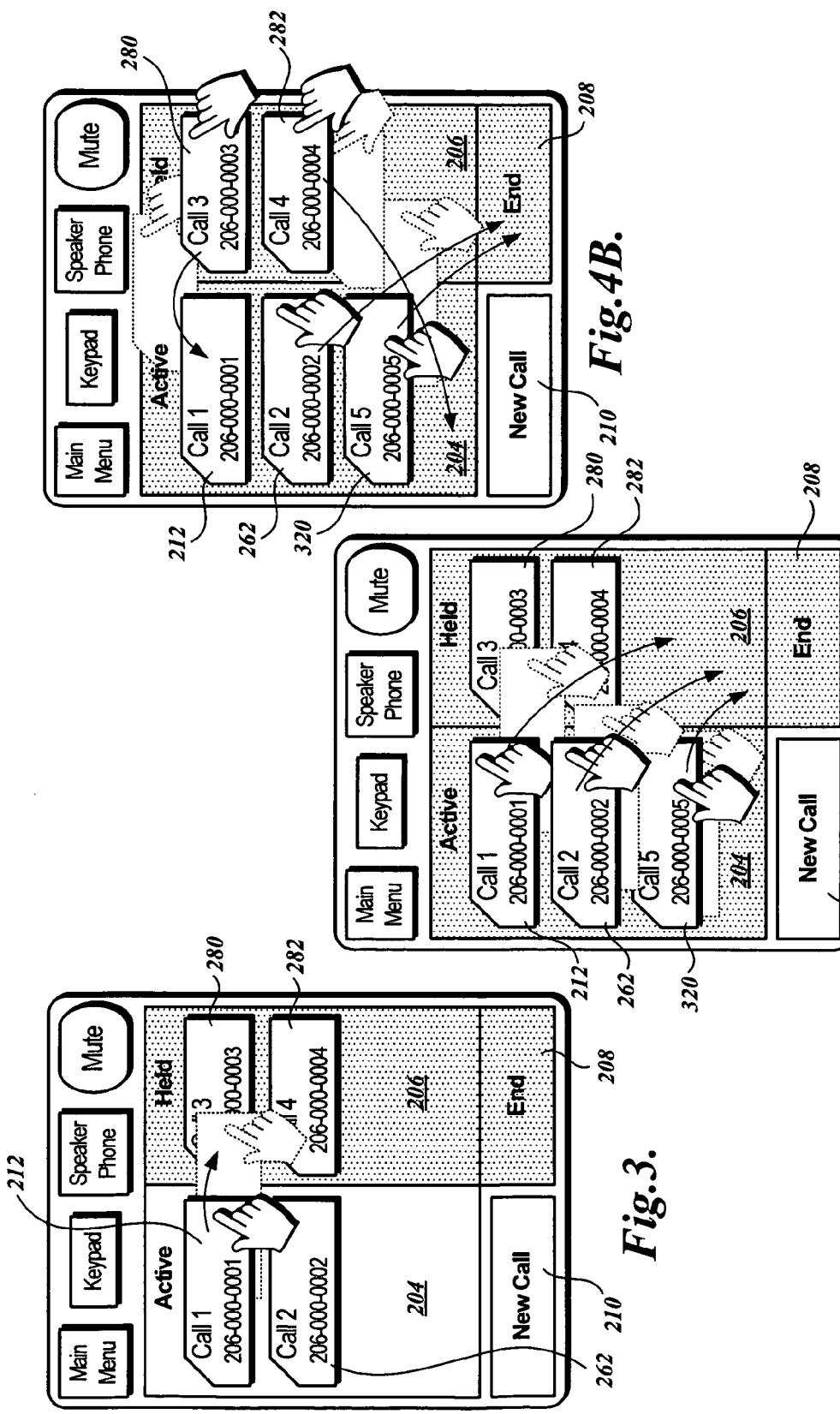

USER INTERFACE FOR A COMMUNICATION DEVICE

TECHNICAL FIELD

The present disclosure relates to communication systems and, in particular, to user interfaces for managing communications in a communication device.

BACKGROUND

As the functional capabilities of communication devices increase, it becomes increasingly difficult for users to interact with the device to access and utilize all the functionality provided. As a result, most communication devices employ complicated menu settings or require a user to remember a series of steps that must be performed in order to access or utilize a particular function. Alternatively, many communication devices employ multifunction buttons or keys that change the function performed depending on a sequence of control keys pressed. The result is a less than satisfying user experience when using or activating more advanced features of a communication device.

One function that users find particularly difficult to use on a communication device is communication management involving two or more communications, such as voice communications, instant messaging communications, etc. Device users who are engaged in a communication with a third party and who then receive notice of an incoming communication from another third party may want to conference the incoming communication into an currently active communication session, may want to accept the incoming communication while placing the current communication on hold, or may want to reject the incoming communication and continue with the current communication. In addition, the device user may want to quickly swap between a communication that is active and one that is on hold, without having to conference the communications together into one communication (or "conference") session. To accomplish these ends, most communication devices require that a device user navigate a complicated sequence of keystrokes, menus or change device settings in order to set up and manage communications involving two or more third parties. Such keystrokes, menus and/or device settings can be difficult to remember, thereby increasing the chance that an important communication will be dropped or at least inartfully handled.

Given these problems, there is a need for a user interface that allows a user to easily and efficiently handle communications without having to navigate through multiple keystrokes, menus and device settings.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

To address the above-discussed problems, the present disclosure describes a user interface that allows a communication device user to handle communications by moving icons representing each third communication on a touch screen display. In one embodiment, the user interface includes an active communication area in which one or more communication icons representing active communications are displayable, and a held communication area in which one or more communication icons representing held communications are displayable. A user manages communications by moving the communication icons into and/or between the active communication area and held communication area on a touch screen display using, for instance, a "drag and drop" motion or a "pop and hop" motion.

In another embodiment, the disclosure describes a communication device having a touch screen display, one or more processors, memory, and one or more programs stored in the memory including instructions for displaying a user interface on the touch screen display that includes an active communication area in which one or more communication icons representing active communications are displayable, and a held communication area in which one or more communication icons representing held communications are displayable. The memory includes instructions for managing a communication in accordance with a detected position of an associated communication icon within the user interface.

In another embodiment, the disclosure describes a method implemented by a communication device of the type having a touch screen display for allowing the user to manage a two or more communications by displaying a user interface on the touch screen display that includes an active communication area in which one or more communication icons that represent active communications are displayable, and a held communication area in which one or more communication icons that represent held communications are displayable. Communications are handled in accordance with a detected position of a communication icon in the user interface. In one embodiment, a processor executes instructions for adding one or more communications to a conference communication upon detection of a user adding communication icon(s) to the active communication area from an incoming communication area or a held communication area.

In another embodiment, the disclosure describes a computer program product including a computer storage medium having instructions thereon that are executable by a processor in a communication device of the type having a touch screen display to allow a user to manage communications by displaying a user interface on the touch sensitive display. The user interface includes an active communication area in which one or more communication icons representing active communications are displayable and a held communication area in which one or more communication icons representing held communications are displayable. The processor executes instructions for managing a communication in accordance with a detected position of a communication icon within the user interface.

In another embodiment, the disclosure describes a communication device with a touch screen display including means for displaying a user interface for allowing a user to manage communications where the user interface includes an active communication area in which one or more communication icons representing active communications are displayable, a held communication area in which one or more communication icons representing held communications are displayable, and means for managing communications in accordance with a detected position of a corresponding communication icon within the user interface.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 illustrates the use of a user interface to handle communications by dragging communication icons on a touch-screen display in accordance with an embodiment of the subject matter described herein; and FIGS. 4A-4B illustrate the use of a user interface to handle communications by dragging multiple communication icons on a touch-screen display in accordance with an embodiment of the subject matter described herein

DETAILED DESCRIPTION

As indicated above, the subject matter described herein is directed to a user interface for a communication device such as a mobile telephone, cellular phone, cordless phone, landline phone, VoIP phone, a home telecommunications hub, computer, switchboard or other communication device that allows a user to communicate through wired or wireless communication channels. In particular, the user interface allows an operator of the device to manage communications by moving communication icons within the user interface.

Figure 1:
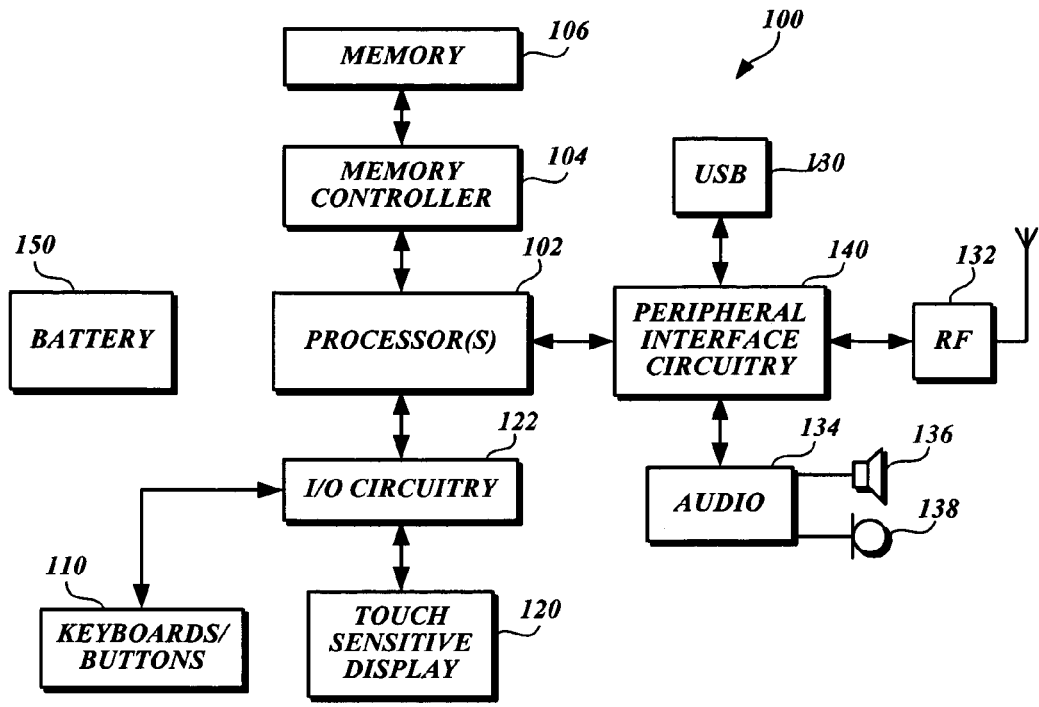
FIG. 1 is a block diagram of a communication device including a touch-sensitive display screen in accordance with one embodiment of the present invention.

FIG. 1 is a block diagram of a communication device 100 with a touch-sensitive display 120 also referred to as a touch screen. The communication device includes one or more processors 102, a memory controller 104, and system memory 106. The system memory 106 generally includes a high-speed random access memory and may include nonvolatile memory including flash memory devices or other nonvolatile solid state memory including one or more magnetic disk storage devices. Stored in the system memory 106 are instructions for an operating system that manages the hardware and software resources of the communication device such as Symbian OS, Microsoft Windows Mobile OS, OS/2, Unix, Linux or other operating systems specifically designed for communication devices. The one or more processors 102 interface with one or more user input devices including a keyboard or user input buttons 110 or the touch-sensitive display 120 through input/output circuitry 122. In addition, the processor 102 interfaces with an external port 130 (e.g., USB, FireWire, infrared port, etc.), RF circuitry 132, and audio circuitry 134 through peripheral interface circuitry 140. The one or more processors 102, memory controller 104, input/output circuitry 122, and peripheral interface circuitry 140 may be provided as separate chips or integrated into a single chip.

The RF circuitry 132 includes conventional circuitry for converting electrical signals to electromagnetic signals for communication. The RF circuitry 132 may communicate via a cellular telephone network using one or more conventional communication protocols including GSM, CDMA, W-CDMA, TDMA, UMTS, EDGE, LTE (Long Term Evolution), or Wimax. In addition or alternatively, the RF circuitry 132 may communicate using Voice Over IP (VoIP), UMA (Unlicensed Mobile Access), Post Office Protocol (POP), Short Message Service (SMS), or other to-be-developed communication protocols. In addition or alternatively, the RF circuitry may communicate over a wired or wireless network using Wi-Fi protocols, Bluetooth®, or other to-be-developed protocols.

The audio circuitry 134 includes a conventional speaker 136 that converts electronic signals to sound waves and a microphone 138 that converts sound waves to electronic signals.

The output port 130 allows a user to connect the communication device 100 to other electronic equipment such as a personal computer, kiosks, printers, scanners, etc., to perform such tasks as updating firmware, sharing or backing up data or charging a battery 150 that powers the communication device.

User input to the communication device 100 is provided via the touch screen 120 that accepts input by detecting contact with a user's finger, a writing stylus, or other pen-like device. The touch screen 120 may include a liquid crystal or liquid polymer display over which is placed a touch-sensing technology including capacitive, inductive, resistive, infrared, surface acoustic waves, or other sensing technology to detect where a user touches the touch screen display with either his or her finger or a writing stylus. In one embodiment, the communication device may also include buttons or a keyboard 110 that allows a user to type messages and provide instructions. The keyboard or buttons 110 may be integrated into the communication device or may be removably attached thereto through a peripheral port.

Although not shown, the communication device may also include additional elements such as a camera, accelerometers, proximity sensors, GPS receivers, or other devices that allow the communication device to provide enhanced functionality.

As indicated above, the processor 102 executes a sequence of instructions stored within the memory 106 that allow the communication device to provide an improved user interface that allows a user to manage two or more communications.

Figure 2:
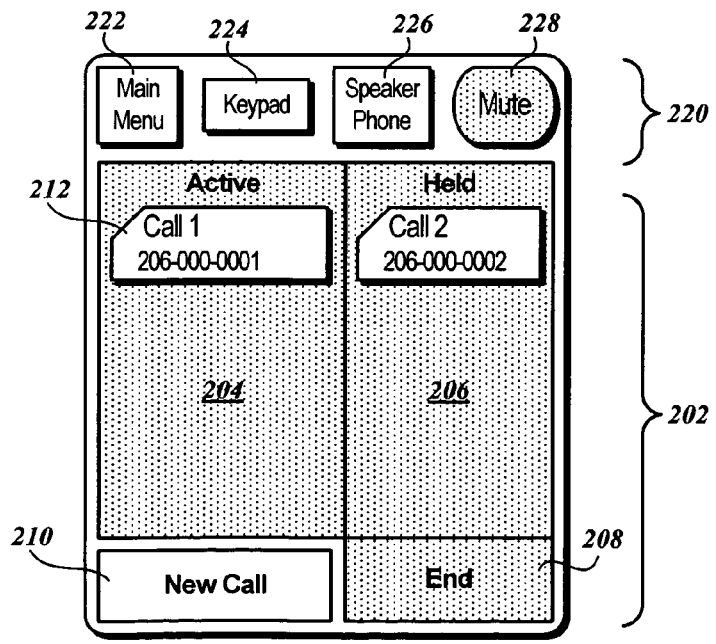
FIG. 2 illustrates one screen of a user interface in accordance with an embodiment of the subject matter described herein.

FIG. 2 illustrates one embodiment of a user interface (UI) 200 in accordance with the subject matter described herein. A user interface 200 has a communication management area 202 where communications are managed and a button area 220 that displays different function buttons of the communication device as will be explained in further detail below. In one embodiment, the user interface is displayed upon selection of a communication management icon (not shown) from a main menu screen of a communication device. Alternatively, the user interface 200 may be displayed anytime a user uses a phone function of the device 100.

The communication management area 202 of the user interface 200 includes an active communication area 204 generally positioned in the upper left hand corner of the communication management area 202. A held communication area 206 is positioned to the right of the active communication area 204. Below the held communication area 206 is an end communication area 208. Finally, a new communication area 210 is positioned to the left of the end communication area 208 and below the active communication area 204 in the lower left hand corner of the communication management area 202. As will be explained in further detail below, a user manages communications within the communication management area 202 by moving communication icons that represent a telephone communication with a third party and placing them in specific areas of the communication management area 202. An icon may consist of the third party's photograph, a user-selected image, the third party's phone number or other information uniquely identifying the third party. In the telephonic communication example shown, a communication icon 212, associated with a first "Call 1", is positioned in the active communication area 204 indicating that "Call 1" is currently active. Similarly, a communication icon associated with a second "Call 2" is positioned in the held communication area 206, indicating that "Call 2" is currently on hold with the communication device.

The button area 220 includes a number of function buttons displayed on the touch screen 120 such as a main menu button 222, a keypad button 224, a speaker phone button 226, and a mute button 228. Touching the main menu button 222 returns a user to a main menu of the communication device. Touching the keypad button 224 opens a keypad such that a user can, for instance, dial a telephone number of a desired third party. A speaker phone button 226 allows a user to activate the speaker 136 or to increase its volume so that a voice conversation can be heard without putting the communication device adjacent the user's ear. Finally, a mute button 228 allows an operator to mute a call (in the case of a voice communication). As will be appreciated, either fewer or additional or different function buttons may be included in the button area 220. The function buttons in the button area 220 may also be physical buttons located on the front or other positions on the communication device.

In one embodiment of the user interface, the user handles or manages communications by moving communication icon(s) associated with one or more communications to the various communication areas on the user interface, using any of a variety of icon movement techniques, such as "drag and drop" in which a user touches then drags the icon to a desired destination, or "pop and hop" in which a user taps or "pops" an icon once then taps the desired destination for the icon. In the embodiment shown in FIGS. 3, 4A and 4B, communications are handled by dragging and dropping the communication icons over the display screen. To answer an incoming communication, a new communication icon is created by the processor 102 and shown in the new communication area 210. The user accepts the communication by dragging the new communication icon into the active communication area 204. Alternatively, the user can accept the communication by tapping the new communication icon once and then tapping the active communication area 204. In either case, the incoming communication represented by communication icon in new field 210 is accepted or answered.

To place a communication on hold, a user touches the associated communication icon and then drags the communication icon into the held communication area 206. Alternatively, the device user may tap the communication icon once and then tap communication area 206, thereby placing the communication on hold. In either case, the communication managed via a communication icon may be placed on hold whether the communication icon represents a new or incoming communication in new field 210 or an active communication appearing in communication field 204. Thus, in FIG. 4A, active "Call 2" and active "Call 5" may be placed on hold by dragging and dropping their respective icons into held communication area 206.

If a device user wants to place an active communication on hold and make a held communication active, he or she may quickly swap the corresponding communication icons by touching the "Call 1" communication icon 212 and dragging it such that it is superimposed over the held "Call 3" communication icon 280. Dragging a communication icon in the active communication area 204 over a communication icon in the held communication area 206, or vice versa, causes the processor to execute instructions to swap the held communication from the active communication area.

If a user wants to terminate a communication that is new, active or on hold, he or she may touch a communication icon or icons appearing in any of fields 204, 206 and/or 210 and drag it/them into the end communication area 208, and release the icon(s). This causes the processor to execute instructions to disconnect or otherwise terminate the communication(s) represented by the communication icon(s).

If a user simply wants to place one or more active and/or incoming communications on hold, along with currently held communication(s), he or she may simply touch the relevant communication icon(s) and drag such icon(s) to an empty space (i.e., an area that does not substantially superimpose over another communication icon) of the held communication area 206. This causes the processor to execute instructions that place the communication(s) associated with the dragged communication icon(s) on hold. An incoming communication can be ignored in this manner, by dragging the associated communication icon to the end communication area 208.

Conference communications may be created upon detection that a user has placed two or more communication icons into the empty space (i.e., an area that does not substantially superimpose over another communication icon) of the active communication area, or has dragged and dropped a communication icon into the active communication area in which another communication already resides. In the example shown in FIG. 3, communication icons 212 and 262 are positioned in the active communication area 204. Therefore, the processor executes instructions to place "Call 1" and "Call 2" in conference. Dragging a communication icon out of the active area causes the processor to execute instructions to remove the associated communication from conference.

In one embodiment of the user interface of FIG. 3, no action is taken until the user removes his or her finger from the touch screen. When the user has substantially completed the "drag and drop" motion or the "pop and hop" motion, the user may be presented with a short message or instructional animation displaying or describing the result of the call management motion or gesture. For example, upon dragging a communication icon to a new location and not removing one's finger, an animation may appear in a pop-up window or other frame and display in animated, text, audio and/or other form the result of his or her actions. For example, if the device user drags a communication icon from the new communication area 210 to active area 204, then holds the icon in communication area 204, the device may present a short animation of someone answering a telephone. Alternatively, if the device user drags a "Call 1" communication icon 212 from area 204 and superimposes it over a "Call 3" communication icon 280 in held area 206, a short animation may be displayed showing the "Call 1" communication icon falling asleep and the "Call 3" communication icon waking up. If the user removes his or her finger from the touch screen with the communication icon moved to the new position, the processor executes the instructions required to implement the action represented by the animation. However, if the user moves his or her finger or other writing device back to the starting location, no action will take place. In an embodiment, the animation or dialogue window that displays the informational material may additionally incorporate a "cancel" button or similar icon which the user may select by sliding his or her finger, a stylus or other object to and release, thereby cancelling the call management action that would have been initiated had the user not selected the cancel option.

As an alternative to dragging a single communication icon or "popping" a single communication icon, as shown in FIG. 3, multiple communication icons can be dragged or tapped simultaneously. FIGS. 4A and 4B illustrate an example whereby three communication icons associated with "Call 1", "Call 2", and a "Call 5" as represented by icons 212, 262, and 320 are illustrated as being simultaneously dragged into an open or free space of the held communication area 206. As a result, the processor executes instructions to place each of the communications associated with communication icons 212, 262, and 320 on hold, and no communications will remain active. In the example shown in FIG. 4B, the communication associated with communication icon 280 is shown as being dragged over the communication icon 212 that is associated with "Call 1". The processor therefore executes instructions to play an animation of swapping held "Call 3" for active "Call 1". Upon detection that the user has released the communication icon 280 over the communication icon 212, the processor executes instructions to swap "Call 3" for "Call 1", such that "Call 3" will be placed in an active conference communication, and "Call 1" will be put on hold.

The communication icon 262 associated with "Call 2" is shown in FIG. 4B as being dragged into the end communication area. This causes the processor to execute instructions to terminate or end "Call 2". The communication icon 282 associated with "Call 4" is shown as being dragged into an open or free space of the active communication area 204, thereby causing the processor to execute instructions to play an animation of the actions to take place and upon detection that the user has released the communication icon 282 in the active communication area, to place "Call 4" into conference with "Call 1". Finally, the icon 320 associated with "Call 5" is shown as being dragged into the end communication area 208, thereby causing the processor to execute instructions to disconnect "Call 5" from the communication device after playing the animation.

As will be appreciated by those skilled in the art, the acts of placing certain types of communications into conference, placing communications on hold, swapping communications or disconnecting communications, are actually performed by a remote network or other communication processor. For instance, telephonic communications (whether landline, VoIP, wired or wireless) may be placed into conference, on hold, swapped from active to hold and vice versa, and terminated, at network locations rather than on the user device itself. Therefore, when the processor of the communication device 100 executes instructions to perform these tasks, it includes the steps of transmitting RF or other signals to the communication processor (not shown) in accordance with an agreed upon communication protocol in order to instruct the communication processor to handle a communication as requested. Other types of communications, such as instant messaging communications, may be accepted, rejected, placed on hold, swapped, etc., on the device itself. For instance, an instant messaging communication may be placed on hold simply by ensuring that no incoming/outgoing instant messages from/to an instant messaging third party are muted while communication icon relating to the third party resides in held field 206.

Figure 5:
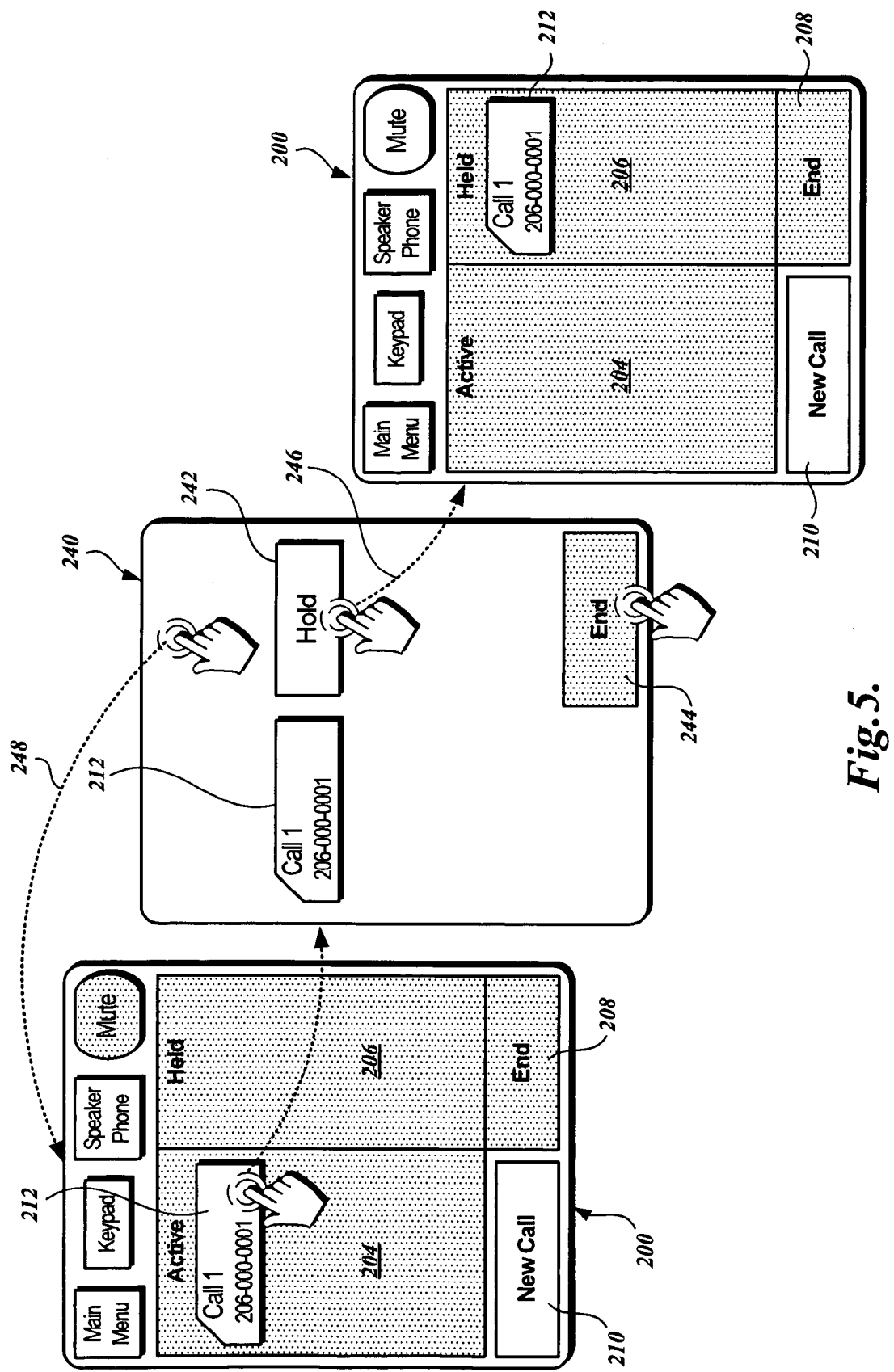
FIG. 5 illustrates the operation of the user interface to place a communication on hold in accordance with an embodiment of the subject matter described herein.

In another embodiment, shown in FIG. 5, a user manages communications with the user interface 200 by selecting a communication icon such as by tapping on the icon. In the example shown, a user taps on the communication icon 212. Upon detection of a user tapping a communication icon, the processor executes instructions to produce a new screen 240 with buttons that allow a user to change the status of the communication associated with the selected communication icon. The screen 240 includes a hold button 242 positioned generally in the held communication area 206. Upon tapping the hold button 242, the communication icon 212 is moved over to the held communication area 206, and the communication associated with the communication icon 212 is placed on hold as depicted by the screen at the end of arrow 246. An end communication button 244 is also provided on the screen 240. Upon selection of the end communication button 244, the communication associated with icon 212 is ended.

In one embodiment, any activity that will be performed as a result of user action on the user interface is animated prior to the action taking place. In one embodiment, the action does not take place until the user has released the tap on the screen. For example, by touching the hold button 242 and releasing it, the communication device will place the communication associated with icon 212 on hold after showing an animation of the communication icon 212 moving into the held communication area 206. The action of placing the communication on hold does not take place until the user releases his or her finger from the hold button 242. If the user does not wish to perform the action, the user can drag his or her finger back to the active communication area 204, and no action will occur. Alternatively, if the user taps anywhere else on the screen 240 other than the buttons 242, 244 or waits longer than a predetermined amount of time (e.g., more than three seconds), the communication icon 212 will remain in the active area 204, and no change to the associated communication will occur as represented by the screen at the end of arrow 248.

Figure 6:
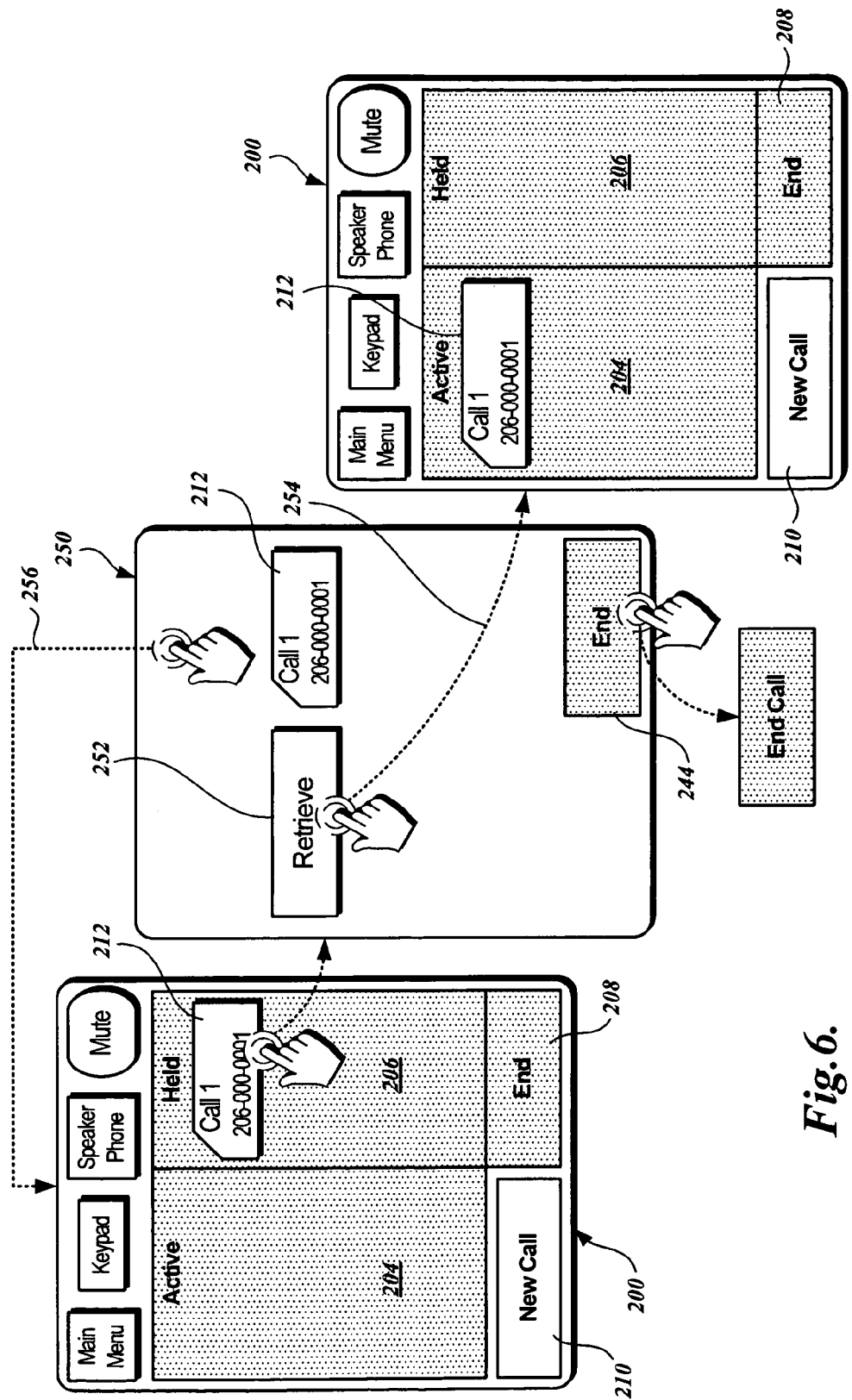
FIG. 6 illustrates the operation of a user interface to retrieve a communication previously placed on hold in accordance with an embodiment of the subject matter described herein.

FIG. 6 illustrates operation of the user interface 200 to retrieve a held communication. A user first taps the "Call 1" icon 212 that is positioned in the held communication area 206. Upon selection or tapping of the communication icon 212, a new screen 250 is presented with buttons that are indicative of what a user can do with the held communication. A retrieve communication button 252 is placed in the area of the active communication area 204. Upon selection of the retrieve communication button 252, an animation is performed showing the Call 1 icon 212 being moved over into the active communication area 204. Upon release of the button 252, the communication associated with communication icon 212 is retrieved and made active as depicted in the screen at the end of arrow 254. Alternatively, the end button 244 is also presented on the screen 250. Upon selection of the end button 244, the communication represented by the icon 212 is ended. If the user taps anywhere else on the screen 250 or waits more than a predetermined time (e.g., more than three seconds), the communication represented by icon 212 remains on hold and the communication icon 212 remains in the held communication area 206 as shown in the screen at the end of arrow 256.

Figure 7A:
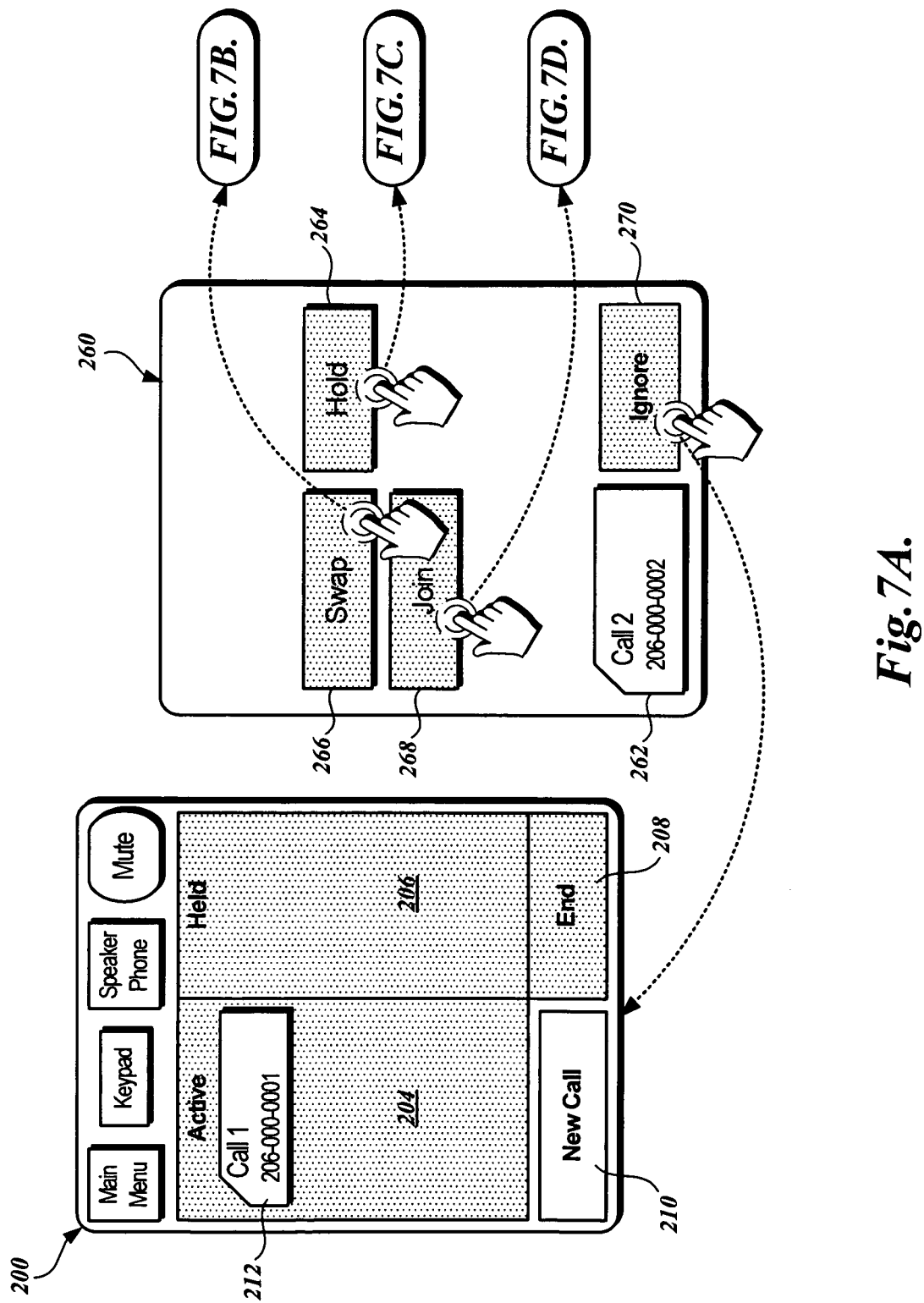
FIGS. 7A-7D illustrate the operation of a user interface to swap an active communication with a communication placed on hold, to place an incoming communication on hold, or to join communications into a conference communication in accordance with an embodiment of the subject matter described herein.
Figure 7D:
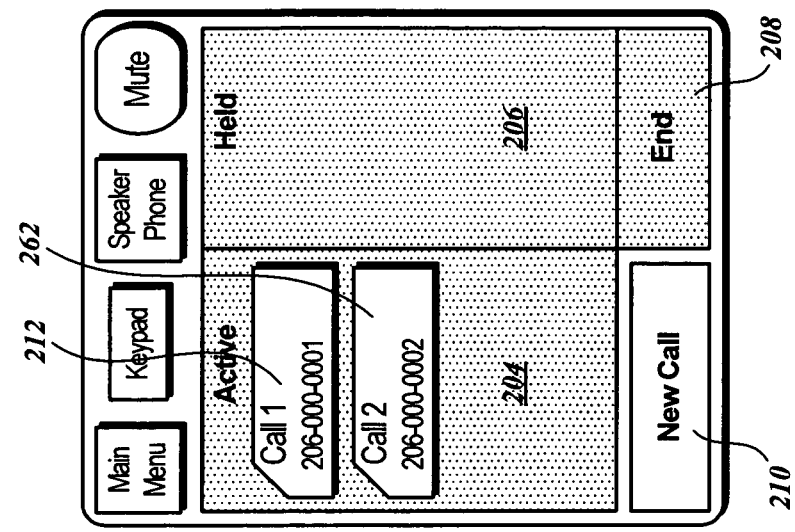
Figure 7C:
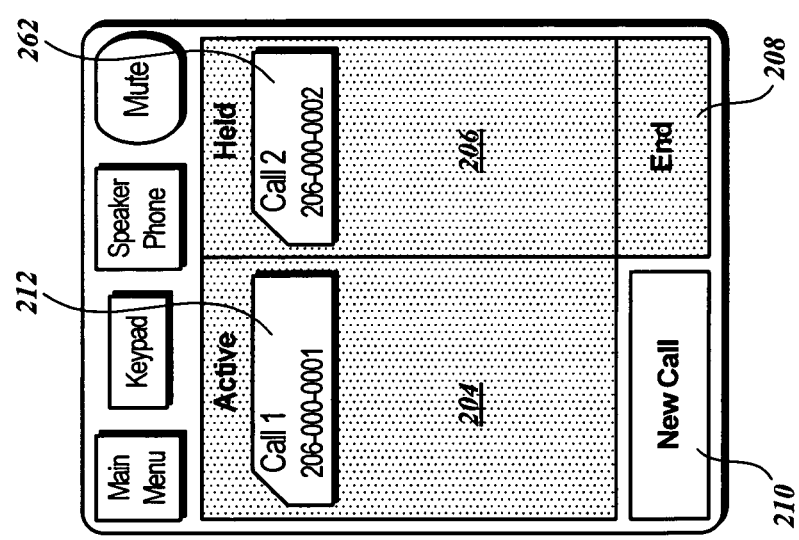
Figure 7B:
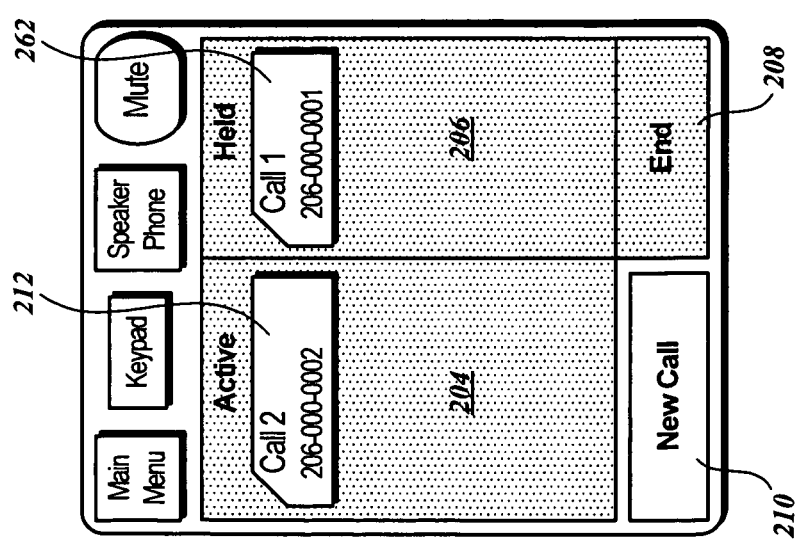

FIGS. 7A-7D illustrate the use of the user interface 200 when a "Call 1" is active and a second communication is received by the communication device. Upon detection of an incoming communication, the processor executes instructions to produce a new screen 260 showing a new communication icon 262 in the new communication area that is representative of the second communication to the communication device. The screen 260 has a number of buttons that are positioned in a manner indicative of the function performed by the buttons. For example, a hold button 264 is positioned over the hold communication area 206. Selection of the hold button 264 places the new communication represented by communication icon 262 on hold and displays the communication icon 262 in the held communication area 206, as shown in FIG. 5C. Screen 260 also includes a swap button 266 positioned in the area of the active communication area 204. Upon detection that a user has tapped the swap button 266, the processor executes instructions to swap the communication represented by communication icon 262 with the communication represented by communication icon 212. The communication represented by communication icon 262 is made active and the communication represented by communication icon 212 is placed on hold, as shown in FIG. 7B.

A join button 268 is also positioned over the active communication area 204. Upon detection of a user selecting the join button 268, the processor executes instructions to place the communications represented by communication icons 212 and 262 into a conference communication and places both communication icons 212 and 262 in the active communication area 204, as shown in FIG. 7D. An ignore button 270 is positioned in the general area of the end communication area 208. Upon detection that a user has selected the ignore button 270, the processor executes instructions to ignore the incoming communication (which may include playing a message to the communicationer), and the status of the remaining communications, either active or held, remains the same. Although the above description shows the second communication as being received by the communication device, it will be appreciated that a user can also initiate the second or subsequent communications from the communication device and manage such a communication in the same manner as an incoming communication.

Figure 8A:
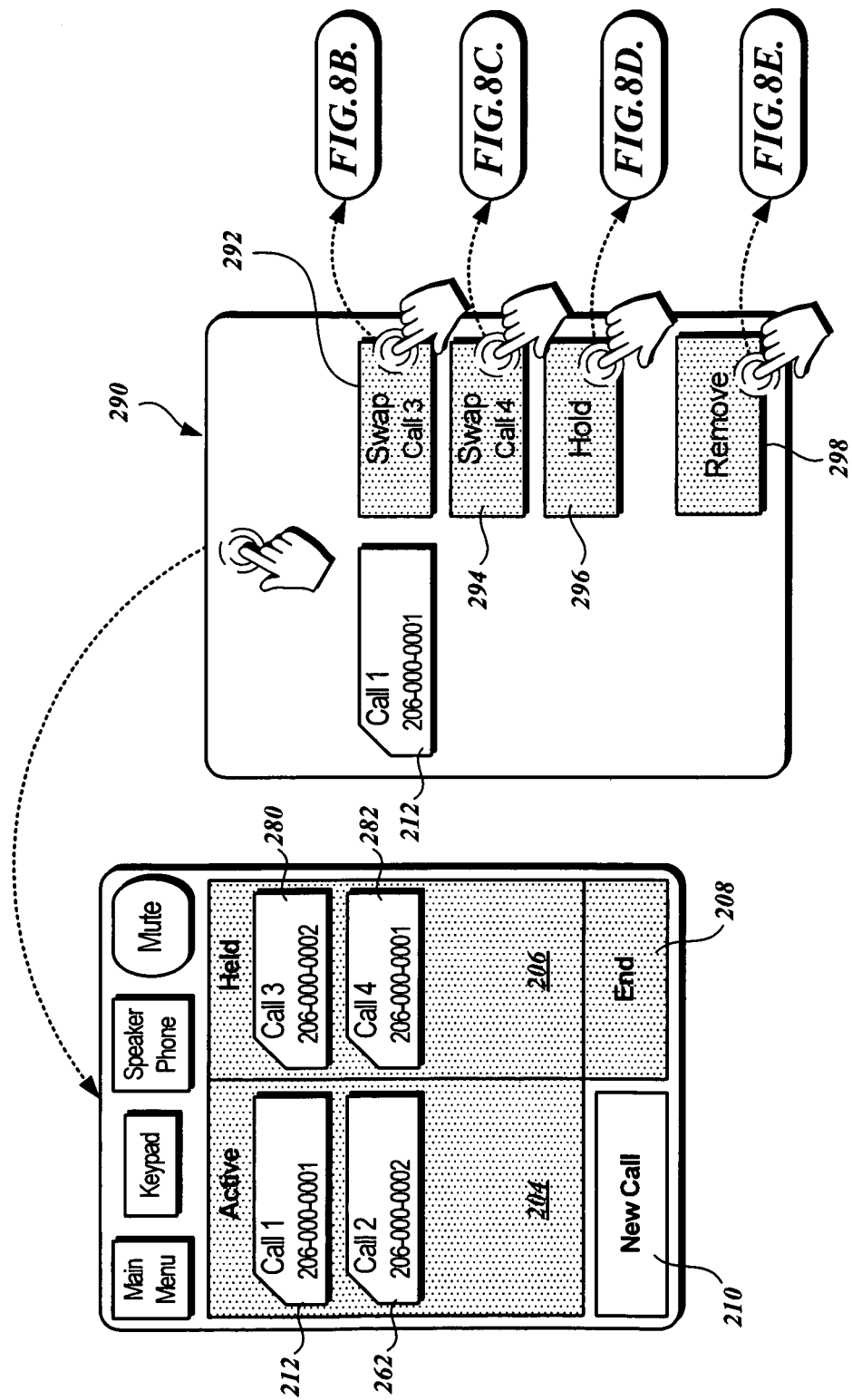
FIGS. 8A-8E illustrate the operation of a user interface to handle multiple communications in a conference communication in accordance with an embodiment of the subject matter described herein.
Figure 8C:
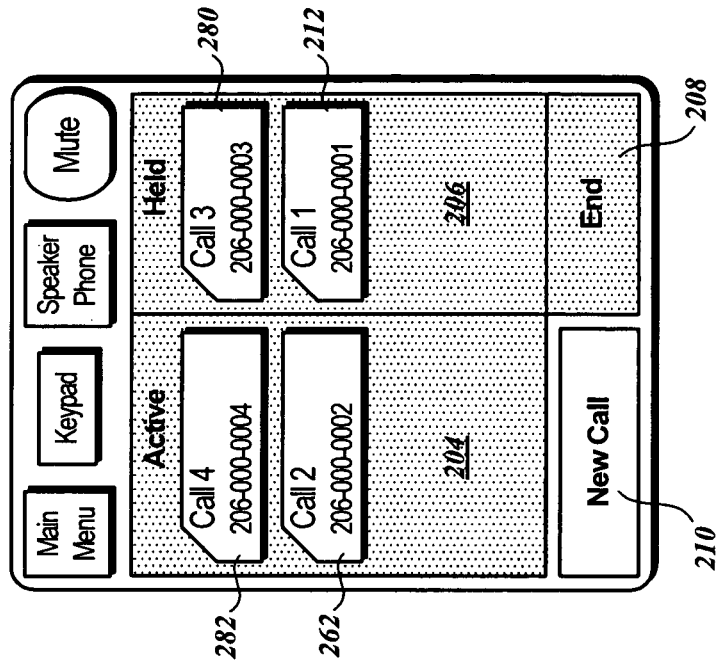
Figure 8B:
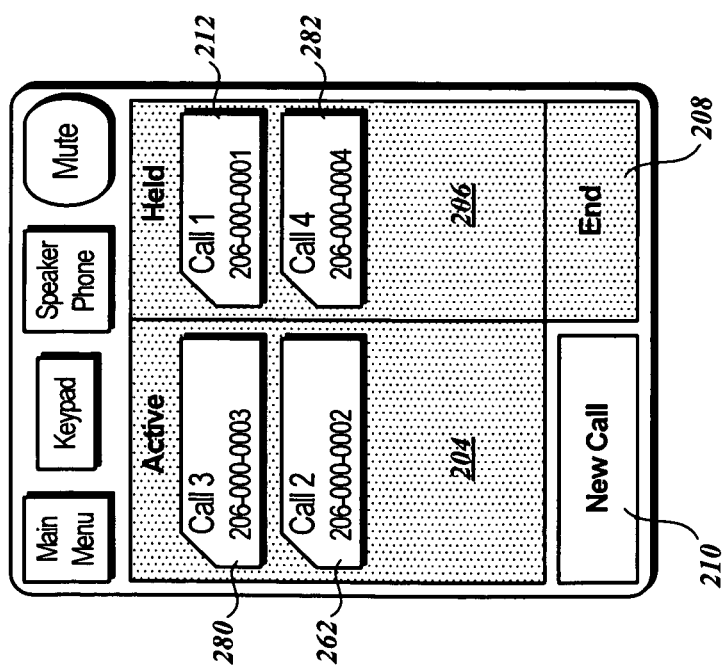
Figure 8E:
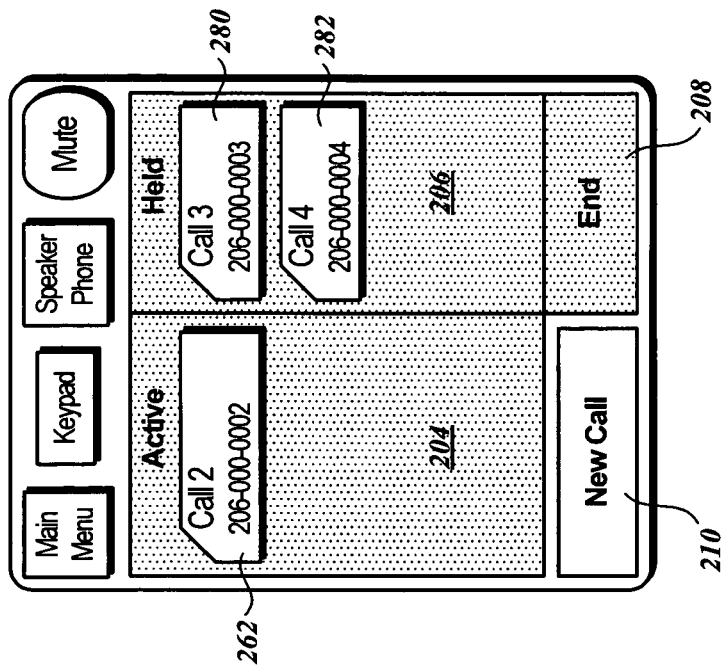
Figure 8D:
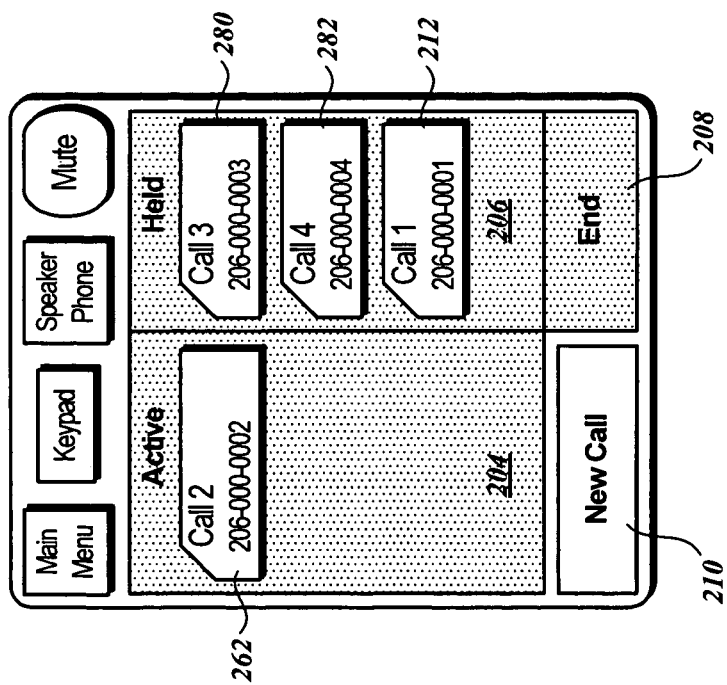

FIGS. 8A-8E illustrate the operation of the user interface to manage an active communication when multiple communications are active and/or on hold. In the example shown, two communications are active as indicated by the communication icons 212, 262 positioned in the active communication area 204 and two communications are on hold as indicated by the communication icons 280 and 282 positioned in the held communication area 206. Upon detection that a user has selected any of the icons, the processor executes instruction to produce a new screen 290 with a number of buttons indicative of the options available to the user for handling the communications. In the example shown, the user has touched the communication icon 212 associated with "Call 1". The processor therefore executes instructions to produce buttons in the screen 290 that allow the user to swap the active communication with "Call 3" represented by communication icon 280 or with "Call 4" represented by communication icon 282. Buttons are also presented to allow the user to place "Call 1" on hold or to remove "Call 1" from an ongoing conference communication. A button 292 is provided that if selected causes the processor to execute instructions to swap "Call 3" for "Call 1" in an active conference communication and to place "Call 1" and "Call 4" on hold, as shown in FIG. 8B. Detection of a user pressing a button 294 causes the processor to execute instructions to swap "Call 1" with "Call 4", as shown in FIG. 8C. Detection that a user has selected a button 296 causes the processor to execute instructions to place the communication associated with the selected communication icon on hold. In the example shown, detection that a user has selected button 296 places "Call 1" on hold along with "Call 3" and "Call 4" and displays the communication icons 212, 280, 282 in the held communication area 206, as shown in FIG. 8D. Detection that a user has pressed a button 298 causes the processor to execute instructions to remove the selected communication from an ongoing conference communication and disconnect it, as shown in FIG. 8E.

Figure 9A:
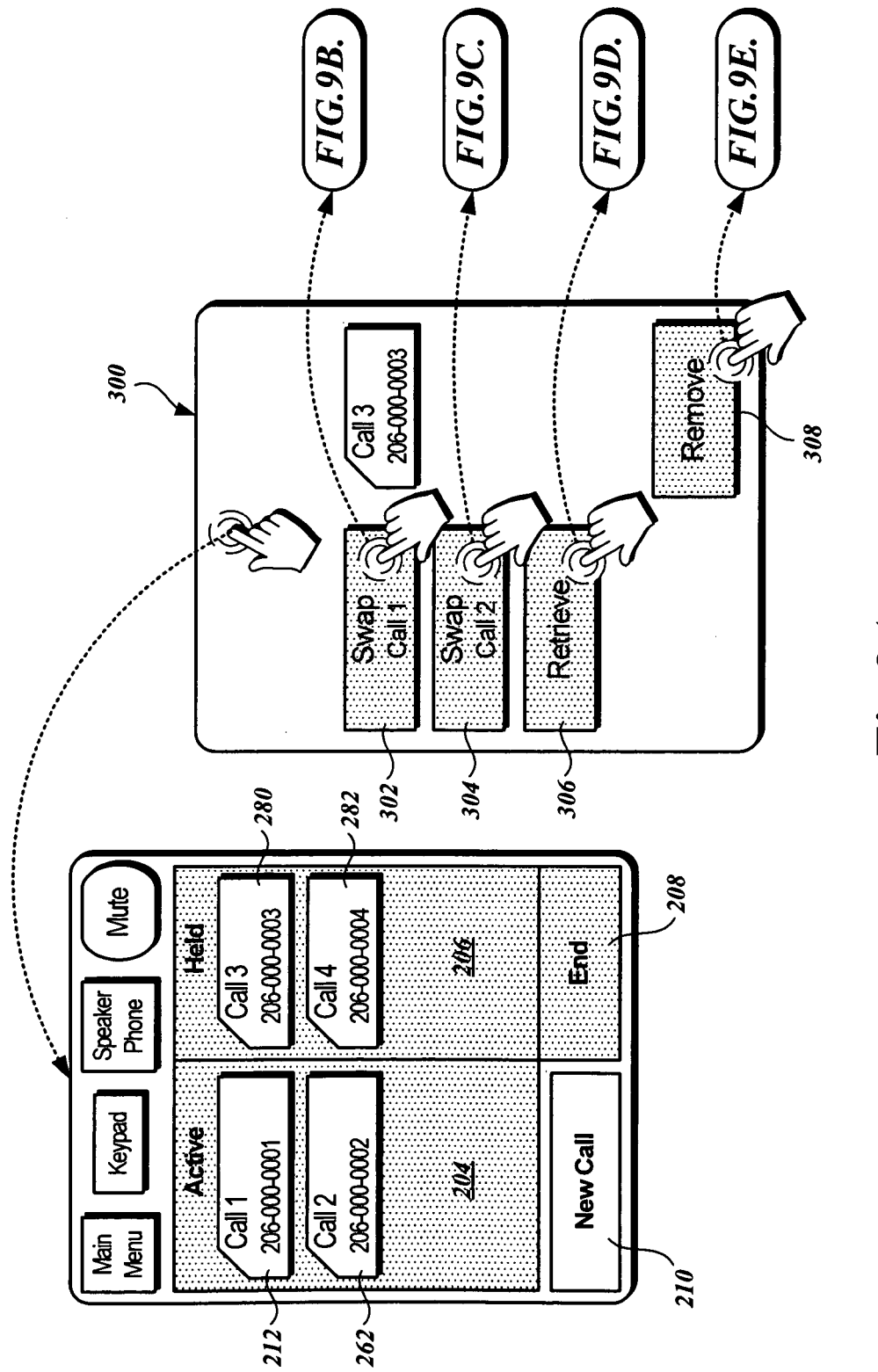
FIGS. 9A-9E illustrate the operation of a user interface to handle a communication on hold in accordance with an embodiment of the subject matter described herein.
Figure 9C:
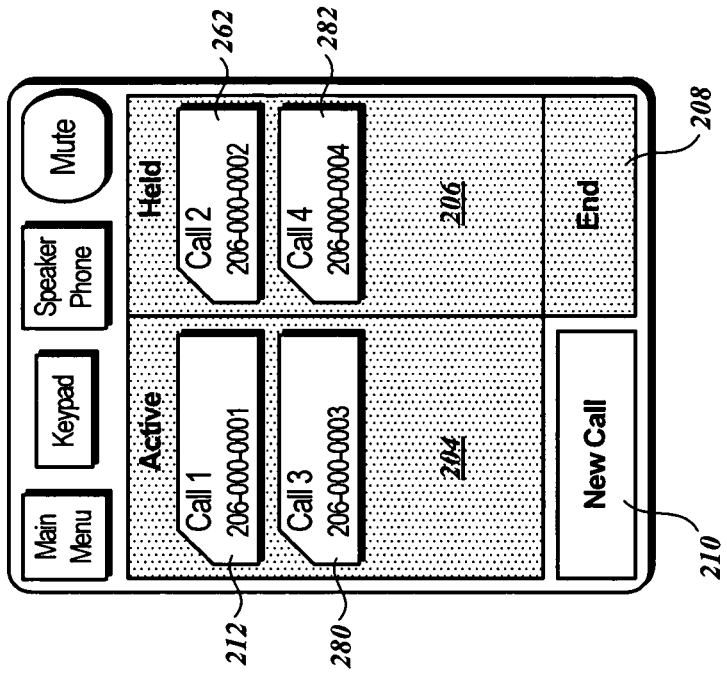
Figure 9B:
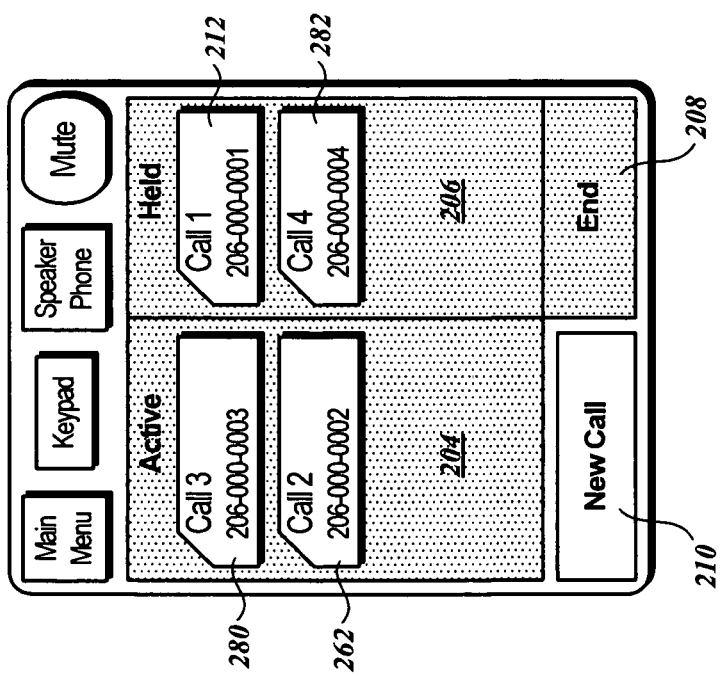
Figure 9E:
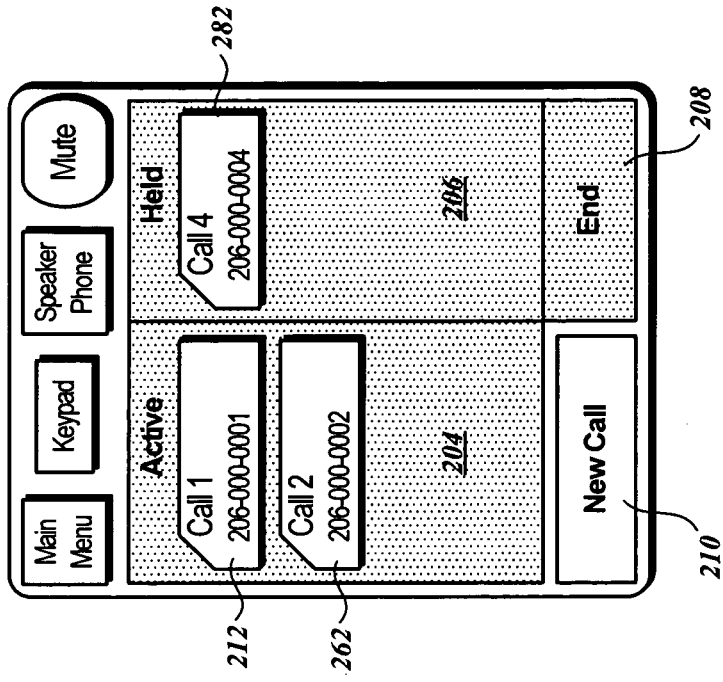
Figure 9D:
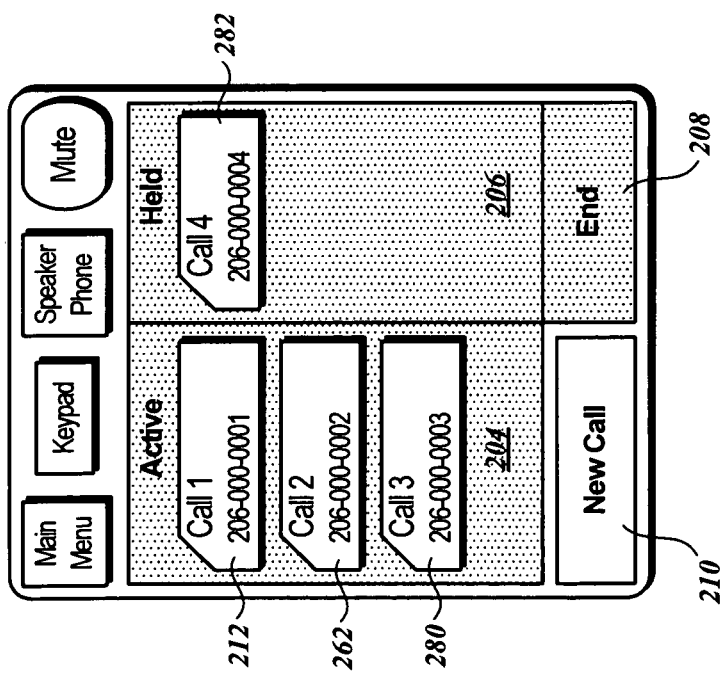

FIGS. 9A-9E illustrate the use of the user interface 200 to manage a held communication when multiple communications are active and/or on hold. Upon detection that a user has selected a single communication that is currently on hold, for example, "Call 3" represented by communication icon 280, the processor executes instructions to produce a new screen 300 with a number of buttons showing the options available to the user to manage "Call 3". A button 302 allows a user to swap the selected held communication with one of the active communications. For example, upon detection that a user has selected button 302, the processor executes instructions to make the held "Call 3" active and place communication icon 280 representative of "Call 3" in the active communication area 204 and to place "Call 1" on hold and place communication icon 212 representative of "Call 1" in the held communication area 206, as shown in FIG. 9B. A button 304 allows a user to swap the selected held communication with a different active communication. In the example shown, upon detection that the user has pressed button 304, the processor executes instructions to make "Call 3" represented by communication icon 280 active and to place "Call 2" represented by communication icon 262 on hold, and to display the communication icon 280 in the active area 204, as shown in FIG. 9C. A button 306 allows the user to retrieve the selected communication from on hold and to place the communication into conference with other communications represented by communication icons shown in the active area 204. Upon detection that a user has selected button 306, the processor executes instructions to place the communication represented by communication icon 280 into an active mode and if there are any communication icons displayed in the active communication area 204, into conference with those communications, as shown in FIG. 9D. A remove button 308 disconnects the communication associated with the selected communication icon from the communication device. Upon detection that the user has pressed the button 308, the processor executes instructions to terminate the communication associated with the selected communication icon, as shown in FIG. 9E. If the user does not select any of the buttons 302, 304, 306, or 308 and instead taps somewhere else on the display screen 300 or waits too long without selecting a button, no action is taken with respect to any of the communications on hold or the active communications.

As will be appreciated from the above, the subject matter described herein provides an intuitive mechanism for allowing a user to manipulate and manage multiple communications on a communication device. Although the disclosed embodiments of the subject matter described herein are primarily directed to the use of the invention in mobile, cellular telephones, it will be appreciated that other telephone systems or mobile or non-mobile communication devices that handle multiple communications could also utilize the subject matter described herein. For example, the disclosed technology could also be used with laptop or tablet computers, SmartPhones, wired or wireless home phones, media players, digital picture frames, e-board devices like a white board where the user can write and that include communication capabilities. Furthermore, although the described embodiments use finger or stylus tapping or dragging and dropping communication icons on a touch screen display to move the communication icons, it will be appreciated that other input device such as thumbwheels, a mouse pad, a touch sensitive pad, etc. could also be used to move the communication icons.

While illustrative embodiments have been illustrated and described, it will be appreciated that various changes can be made therein without departing from the scope of the invention.

The embodiments of the invention in which an exclusive property or privilege is claimed are defined as follows:

1. A mobile communication device, comprising:
   a touch screen display;
   one or more processors;
   memory; and
   one or more programs stored in the memory including instructions for displaying a user interface on the touch screen display wherein the user interface includes:
      an active communication area in which one or more communication icons that represent active communications can be displayed; and
      a held communication area in which one or more communication icons that represent held communications can be displayed;
   wherein the instructions further include instructions:
      for allowing a user to touch and drag a persistently displayed communication icon within the user interface;
      for allowing a user to simultaneously drag a first communication icon with a first finger and at least a second communication icon with a second finger within the user interface;
      for displaying the first communication icon and at least the second communication icon representing first communication and at least a second communication respectively,
         wherein the first and second communication icons are configured to be manually draggable within the user interface and configured to persistently display call information about the first and the second communications respectively;
      for detecting a position of a communication icon within the user interface by monitoring where the user has manually dragged the communication icon within the user interface and via the touch screen display; and
      for handling a communication in response to the detected position of an associated communication icon.

2. The communication device of claim 1, wherein the instructions include instructions for detecting the presence of two or more communication icons in the active communication area and for placing each communication associated with the two or more communication icons into conference.

3. The communication device of claim 1 wherein the instructions include instructions for detecting a communication icon being removed from the active communication area in which two or more communication icons are located and for removing the communication associated with the removed communication icon from the conference.

4. The communication device of claim 1, wherein the instructions include instructions for displaying an end communication area in the user interface and instructions for terminating a communication upon detection of a user moving a communication icon into end communication area.

5. The communication device of claim 1, wherein the instructions include instructions for detecting a communication icon that is positioned in the active communication area being moved over another communication icon positioned in the held communication area, or vice versa, and for swapping the communication associated with the communication icon in the active communication area with the communication associated with the communication icon in the held communication area.

6. The communication device of claim 1, wherein the instructions include instructions for displaying function buttons within the user interface that are indicative of how a communication should be managed, wherein the instructions include instructions for moving a communication icon within the user interface upon detection of a user selecting a function button.

7. The communication device of claim 6, wherein the function buttons include a swap button and the instructions include instructions for swapping an active communication with a held communication.

8. The communication device of claim 6, wherein the function buttons include a retrieve communication button for causing the processor to execute instructions for making a communication active that is associated with a communication icon positioned in the held communication area.

9. The communication device of claim 6, wherein the function buttons include a hold button for causing the processor to execute instructions for placing communication on hold and moving a communication icon to the held communication area.

10. The communication device of claim 6, wherein the function buttons include a remove button for causing processor to execute instructions for terminating a communication.

11. The communication device of claim 1, wherein the instructions include instructions for displaying an animation on the interface that shows a user how a communication will be managed if the user moves an associated communication icon to a new location in the user interface, and wherein the processor executes instructions to manage a communication after the animation has been displayed and upon detection that the associated communication icon has been moved to a new location within the user interface.

12. The communication device of claim 1, wherein the instructions further include instructions:
   for detecting a first position of the first communication icon and a second position of the second communication icon within the user interface by monitoring where the user has simultaneously dragged the first communication icon and the second communication icon within the user interface and via the touch screen display; and
   for handling the first communication and at least the second communication in response to the detected first position and the second position of the first and second communication icons respectively.

13. A method implemented by a mobile communication device of the type having a touch screen display for allowing a user to manage communications by:
   displaying a user interface on the touch screen display, wherein the user interface includes:
      an active communication area in which one or more communication icons that represent active communications are displayable; and
      a held communication area in which one or more communication icons that represent held communications are displayable;
   wherein the instructions include instructions:
      for allowing a user to touch and drag a persistently displayed communication icon within the user interface;
      for allowing a user to simultaneously drag a first communication icon with a first finger and at least a second communication icon with a second finger within the user interface;

for displaying the first communication icon and at least the second communication icon representing a first communication and at least a second communication respectively,
  wherein the first and second communication icons are configured to be manually draggable within the user interface and configured to persistently display call information about the first and the second communications respectively;
for detecting where a communication icon is positioned within the user interface by monitoring where the user has dragged the communication icon within the user interface; and
for handling a communication in accordance with the detected position of the associated communication icon.

14. A computer program product comprising:
computer-readable storage medium having instructions stored thereon that are executable by a processor in a communication device of the type having a touch screen display to allow a user to manage a communication by displaying a user interface the touch screen display, wherein user interface includes:
  an active communication area in which one or more communication icons that represent active communication are displayable; and
  a held communication area in which one or more communication, icons that represent held communications are displayable;
wherein the instructions include instructions
  for allowing a user to touch and drag a persistently displayed communication icon within the user interface;
  for allowing a user to simultaneously drag a first communication icon with first finger within the user interfaceand to drag at least a second communication icon within the user interface;
  for displaying the first communication icon and at least the second communication icon representing a first communication and at least a second communication respectively,
    wherein the first and second communication icons are configured to be manually draggable within the user interface and configured to persistently display information about the first and the second communications respectively; and
  for monitoring where the user has dragged a communication icon within the user interface handling a communication in accordance with detected position of an associated communication icon within the user interface.

15. A mobile communications device with a touch screen display, comprising:
means for displaying. a user interface that allows a user to manage a communication on the touch screen display, the user interface including:
  an active communication area in which one or more communication icons that represent active communication are displayable; and
  held communication area in which one or more communication icons that represent held communications are displayable;
means for allowing user to touch and drag a persistently displayed communication icon within the user interface;
means for displaying in the user interface a communication icon and at least a second communication icon representing a first communication and at least a second communication respectively,
  wherein the second communication icons are configured to be manually draggable within the user interface and configured to persistently display call information about the first and the second communications respectivety;
means for detecting a position of a communication icon associated with a communication within the user interface by monitoring where the user has dragged the communication icon within the user interface; and
means for handling the communication in accordance with the detected position of the associated communication icon; and
means for displaying an animation on the user interface that shows a user how a communication will be managed if the user moves an associated communication icon to a new location in the user interface.

* * * * *